(12) United States Patent
Hao et al.

(10) Patent No.: US 10,771,284 B2
(45) Date of Patent: Sep. 8, 2020

(54) TROUBLESHOOTING METHOD AND APPARATUS FOR EDGE ROUTING BRIDGE IN TRILL CAMPUS

(71) Applicant: Huawei Technologies Co., Ltd., Shenzhen (CN)

(72) Inventors: Weiguo Hao, Nanjing (CN); Ying Xie, Nanjing (CN); Fengming Zhou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/176,849

(22) Filed: Jun. 8, 2016

(65) Prior Publication Data
US 2016/0285646 A1 Sep. 29, 2016

Related U.S. Application Data

(63) Continuation of application No. PCT/CN2014/086204, filed on Sep. 10, 2014.

(30) Foreign Application Priority Data

Dec. 11, 2013 (CN) .......................... 2013 1 0675157

(51) Int. Cl.
*H04L 12/46* (2006.01)
*H04L 12/721* (2013.01)
*H04L 12/703* (2013.01)

(52) U.S. Cl.
CPC ........ *H04L 12/462* (2013.01); *H04L 12/4641* (2013.01); *H04L 45/28* (2013.01); *H04L 45/66* (2013.01)

(58) Field of Classification Search
None
See application file for complete search history.

(56) References Cited

U.S. PATENT DOCUMENTS 8,787,149 B1 * 7/2014 Ramanathan ........... H04L 45/58
370/216
2010/0246388 A1 * 9/2010 Gupta ................... H04L 49/557
370/225

(Continued)

FOREIGN PATENT DOCUMENTS

CN 102638389 A 8/2012
CN 102780635 A 11/2012
(Continued)

OTHER PUBLICATIONS

Partial English Translation and Abstract of Chinese Patent Application No. CN102970231, Jun. 22, 2016, 7 pages.

(Continued)

*Primary Examiner* — Adnan Baig
(74) *Attorney, Agent, or Firm* — Conley Rose, P.C.

(57) ABSTRACT

A troubleshooting method and apparatus for an edge routing bridge (RB) in a Transparent Interconnection of Lots of Links (TRILL) campus, which belong to the field of communications technologies, where the method includes detecting, by a first edge RB in a multi-homing access group, whether an access link of the first edge RB is faulty, and sending, by the first edge RB, a fault notification message to one or more other edge RBs except the first edge RB in the multi-homing access group using the TRILL campus, when the access link of the first edge RB is faulty, where the fault notification message is used to notify the one or more other edge RBs that the access link of the first edge RB is faulty, and hence effectively increase a network convergence speed and network reliability.

15 Claims, 7 Drawing Sheets

(56) References Cited

U.S. PATENT DOCUMENTS

| | | | |
|---|---|---|---|
| 2011/0299536 A1* | 12/2011 | Cheng | H04L 12/4625 370/392 |
| 2012/0163164 A1 | 6/2012 | Terry et al. | |
| 2012/0307627 A1* | 12/2012 | Oyamada | H04L 41/0668 370/225 |
| 2012/0320739 A1* | 12/2012 | Kamath | H04L 45/66 370/225 |
| 2013/0003738 A1 | 1/2013 | Koganti et al. | |
| 2013/0003739 A1* | 1/2013 | Raman | H04L 45/66 370/392 |
| 2013/0294221 A1* | 11/2013 | Parameswaran | H04L 45/66 370/216 |

FOREIGN PATENT DOCUMENTS

| | | |
|---|---|---|
| CN | 102970231 A | 3/2013 |
| EP | 2696542 A1 | 2/2014 |

OTHER PUBLICATIONS

Senevirathne, T., et al., "Coordinated Multicast Trees (CMT) for TRILL," draft-ietf-trill-cmt-02.txt, Oct. 2, 2013, 16 pages.

Foreign Communication From a Counterpart Application, European Application No. 14870299.6, Extended European Search Report dated Oct. 21, 2016, 8 pages.

Foreign Communication From a Counterpart Application, PCT Application No. PCT/CN2014/086204, English Translation of International Search Report dated Oct. 31, 2014, 2 pages.

Foreign Communication From a Counterpart Application, PCT Application No. PCT/CN2014/086204, English Translation of Written Opinion dated Oct. 31, 2014, 14 pages.

Parker, J., Ed., "Recommendations for Interoperable Networks using Intermediate System to Intermediate System (IS-IS)," RFC 3719, Section 2.2, Feb. 2004, 15 pages.

Perlman, R., et al., "Routing Bridges (RBridges): Base Protocol Specification," RFC 6325, Section 4.4.2, Jul. 2011, 99 pages.

* cited by examiner

US 10,771,284 B2

TROUBLESHOOTING METHOD AND APPARATUS FOR EDGE ROUTING BRIDGE IN TRILL CAMPUS

CROSS-REFERENCES TO RELATED APPLICATIONS

This application is a continuation of International Application No. PCT/CN2014/086204, filed on Sep. 10, 2014, which claims priority to Chinese Patent Application No. 201310675157.X, filed on Dec. 11, 2013, both of which are hereby incorporated by reference in their entireties.

TECHNICAL FIELD

The present disclosure relates to the communications field, and in particular, to a troubleshooting method and apparatus for an edge routing bridge (RB) in a Transparent Interconnection of Lots of Links (TRILL) campus.

BACKGROUND

The TRILL protocol is a routing protocol based on link state calculation in a layer-2 (data link layer) network. A device that runs the TRILL protocol is called a RB. A network including RBs is called a TRILL campus.

To ensure access reliability of a customer edge (CE) device, the CE device generally accesses multiple edge RBs and then accesses a TRILL campus using the multiple edge RBs, which forms a multi-homing access situation. The multiple edge RBs are referred to as a multi-homing access group of the CE device below. There are two working manners of a multi-homing access group. One is an active/standby manner, and the other is an active/active manner.

In the active/standby manner, for a virtual local area network (VLAN) accessed by the multi-homing access group, only one edge RB in the multi-homing access group is allowed to send and receive a packet sent by a CE device in the VLAN to and from the TRILL campus, where the edge RB is referred to as an appointed forwarder (AF). The AF periodically broadcasts a TRILL Hello packet to other edge RBs in the multi-homing access group using an access link of the AF. When the access link of the AF is faulty, the AF cannot send the TRILL Hello packet using the access link. If one or more other edge RBs that is in the same multi-homing access group as the AF does not receive the TRILL Hello packet within predetermined time, for example, N (N is configurable and is three by default) TRILL Hello packet sending periods, the one or more other edge RBs determines that the access link of the AF is faulty, performs TRILL protocol processing, and resets a packet forwarding rule. In the active/active manner, the TRILL Hello packet is not sent among multiple edge RBs in a multi-homing access group. If a fault occurs in an access link of one edge RB, other edge RBs cannot learn the fault, and a CE device still sends data to the faulty edge RB.

In a process of implementing the present disclosure, the prior art has the following disadvantages.

In the active/standby manner, after a fault occurs in an edge RB in a multi-homing access group, other edge RBs can perceive the fault of the edge RB only after set time, and then formulate a new packet forwarding rule, resulting in a low network convergence speed. In the active/active manner, after a fault occurs in an edge RB in a multi-homing access group, because edge RBs do not send a TRILL Hello packet to each other over an access link for negotiation, other edge RBs cannot learn the fault of the edge RB, resulting in a packet loss and decreased network reliability.

SUMMARY

To resolve a problem in the prior art that an edge RB cannot perceive in a timely manner or cannot perceive an access link fault of one or more other edge RBs in a multi-homing access group, embodiments of the present disclosure provide a troubleshooting method and apparatus for an edge RB in a TRILL campus. The technical solutions are as follows.

According to a first aspect, an embodiment of the present disclosure provides a troubleshooting method for an edge RB in a TRILL campus, where the method includes detecting, by a first edge routing bridge RB in a multi-homing access group, whether an access link of the first edge RB is faulty, where the multi-homing access group is used to connect a customer edge device to the TRILL campus, the multi-homing access group includes at least two edge RBs, and each of the edge RBs is connected to the customer edge device using a respective access link, and sending, by the first edge RB, a fault notification message to one or more other edge RBs except the first edge RB in the multi-homing access group using the TRILL campus, when the access link of the first edge RB is faulty, where the fault notification message is used to notify the one or more other edge RBs that the access link of the first edge RB is faulty.

According to a second aspect, an embodiment of the present disclosure provides a troubleshooting method for an edge RB in a TRILL campus, where the method includes receiving, by a second edge RB in a multi-homing access group, a fault notification message sent by a first edge RB in the multi-homing access group using the TRILL campus, where the multi-homing access group is used to connect a customer edge device to the TRILL campus, the multi-homing access group includes at least two edge RBs, and each of the edge RBs is connected to the customer edge device using a respective access link, and performing TRILL protocol processing according to the fault notification message.

According to a third aspect, an embodiment of the present disclosure provides a troubleshooting apparatus for an edge routing bridge in a TRILL campus, where the apparatus includes a processor configured to detect whether an access link of a first edge RB in a multi-homing access group is faulty, where the multi-homing access group is used to connect a customer edge device to the TRILL campus, the multi-homing access group includes at least two edge RBs, and each of the edge RBs is connected to the customer edge device using a respective access link, and a transmitter configured to send a fault notification message to one or more other edge RBs except the first edge RB in the multi-homing access group using the TRILL campus, when the processor detects that the access link of the first edge RB is faulty, where the fault notification message is used to notify the one or more other edge RBs that the access link of the first edge RB is faulty.

According to a fourth aspect, an embodiment of the present disclosure provides a troubleshooting apparatus for an edge routing bridge in a TRILL campus, where the apparatus includes a receiver configured to receive, using the TRILL campus, a fault notification message sent by a first edge RB in a multi-homing access group, where the multi-homing access group is used to connect a customer edge device to the TRILL campus, the multi-homing access group includes at least two edge RBs, and each of the edge RBs is connected to the customer edge device using a respective access link, and a processor configured to perform TRILL protocol processing according to the fault notification message received by the receiver.

The technical solutions provided in the embodiments of the present disclosure bring the following beneficial effects. When an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

For better understanding of the embodiments of the present disclosure, a network architecture of a TRILL campus is described first.

The TRILL campus generally includes multiple RBs. In the TRILL campus, an RB may play two roles: an edge RB and an intermediate RB. The edge RB is used to perform TRILL encapsulation on a data packet from a CE device, such as an end station (ES) device or a layer-2 bridging device that accesses an ES, to the TRILL campus, and perform TRILL decapsulation on a data packet from the TRILL campus to the CE device. The intermediate RB is responsible for data forwarding in the TRILL campus.

Figure 1:
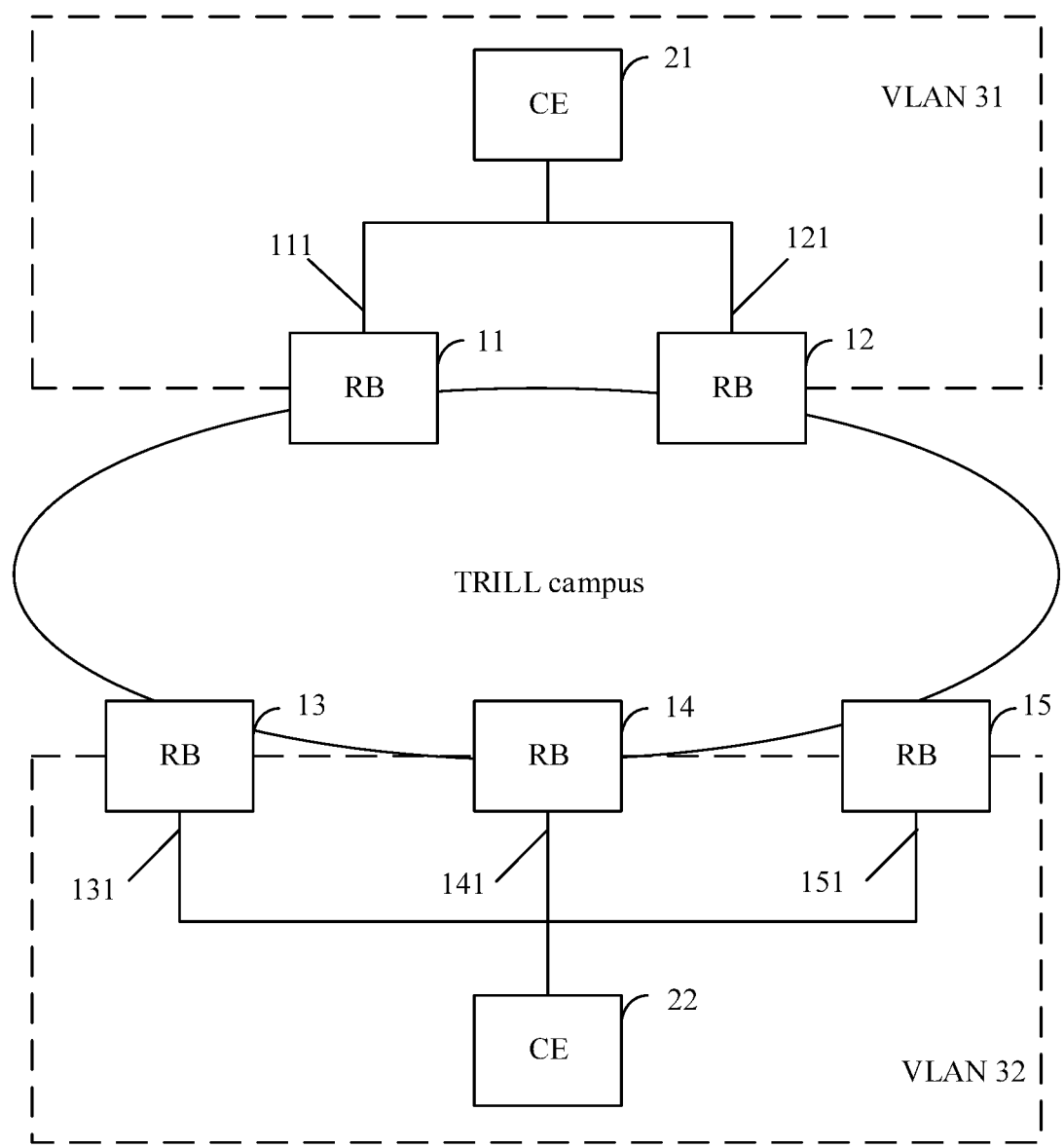
FIG. 1 is a schematic diagram of a network architecture of a TRILL campus according to an embodiment of the present disclosure.

One CE device may access the TRILL campus using multiple edge RBs. In the embodiments of the present disclosure, the multiple edge RBs form a multi-homing access group. As shown in FIG. 1, an RB 11 and an RB 12 are connected to a CE device 21 using a respective access link 111 and 121, and the CE device 21 accesses a TRILL campus using the RB 11 and the RB 12. That is, the RB 11 and the RB 12 form a multi-homing access group. Similarly, an RB 13, an RB 14 and an RB 15 are connected to a CE device 22 using a respective access link 131, 141 and 151, and the CE device 22 accesses the TRILL campus using the RB 13, RB 14 and RB 15. The RB 13, RB 14, and RB 15 form another multi-homing access group. It may be understood that multiple ESs may share one multi-homing access group, that is, multiple ESs may simultaneously access the TRILL campus using edge RBs in one multi-homing access group.

One multi-homing access group may access multiple VLANs, that is, may forward packets of multiple VLANs. For ease of depiction, only one VLAN is shown for each multi-homing access group in FIG. 1. Further, a VLAN 31 is configured for the multi-homing access group formed by the RB 11 and the RB 12, and the CE device 21 belongs to the VLAN 31, and a VLAN 32 is configured for the multi-homing access group formed by the RB 13, the RB 14, and the RB 15, and the CE device 22 belongs to the VLAN 32.

It should be noted that, in FIG. 1, a quantity of RBs and a quantity of ESs (namely, CE devices) in the TRILL campus, a quantity of edge RBs in the multi-homing access group, and a quantity of VLANs that the multi-homing access group accesses are examples, and the present disclosure is not limited thereto.

With reference to the foregoing network architecture, the following briefly describes working manners of a multi-homing access group. Currently, there may be two working manners of a multi-homing access group. One is an active/standby manner, and the other is an active/active manner.

When the working manner of the multi-homing access group is the active/standby manner, each edge RB in the multi-homing access group periodically sends a TRILL Hello protocol packet using a respective access link. The TRILL Hello protocol packet includes a medium/media access control (MAC) address of the edge RB, an identifier (ID) of the edge RB, a designated routing bridge (DRB) priority (where the DRB priority is preset by device maintenance personnel for the edge RB and is a static configuration parameter of the edge RB) of the edge RB, an access port ID of the edge RB, and a list of VLANs that are of accessing CE devices and are enabled for an access port.

After an edge RB receives a TRILL Hello protocol packet sent by one or more other edge RBs, the edge RB may create a neighbor relationship table, where the neighbor relationship table records neighbor information of each neighbor (that is, the edge RB that sends the TRILL Hello protocol packet). The neighbor information includes but is not limited to a MAC address of a neighbor, an ID of the neighbor, an access port ID of the neighbor, and an ID of a VLAN enabled for an access port of the neighbor.

In an initial case or in the case of a faulty DRB, after each edge RB receives the TRILL Hello protocol packet sent by the one or more other edge RBs, each edge RB may further determine the unique designated routing bridge DRB of the multi-homing access group according to a DRB priority in the TRILL Hello protocol packet.

A method for determining a DRB is as follows. Each edge RB compares its own DRB priority with DRB priorities included in received TRILL Hello protocol packets. If the DRB priority of the edge RB is higher than the DRB priorities included in all the TRILL Hello protocol packets, the edge RB determines itself as the DRB. If the DRB priority of the edge RB is lower than a DRB priority included in a received TRILL Hello protocol packet, the edge RB determines that an edge RB of the higher DRB priority is the DRB and waits for a TRILL Hello protocol packet sent by the DRB.

The edge RB that has become the DRB specifies, among the edge RBs in the multi-homing access group, an AF for each VLAN that is enabled for the multi-homing access group. For example, in FIG. 1, assuming that the RB 11 is a DRB of the multi-homing access group formed by the RB 11 and the RB 12, the RB 11 specifies the RB 12 as an AF of the VLAN 31. Assuming that the RB 14 is a DRB of the multi-homing access group formed by the RB 13, the RB 14, and the RB 15, the RB 14 specifies the RB 15 as an AF of the VLAN 32. AFs corresponding to different VLANs may be the same or may be different.

The DRB then periodically sends a TRILL Hello protocol packet, where the sent TRILL Hello protocol packet carries an AF type-length-value (TLV) field in order to notify the other edge RBs of the AF corresponding to each VLAN. When receiving the TRILL Hello protocol packet that carries the AF TLV field, the other edge RBs learn which edge RB is the current DRB and which edge RB is the AF corresponding to each VLAN. Similarly, the current DRB and the AF corresponding to each VLAN are also recorded in the foregoing neighbor relationship table.

When the working manner of the multi-homing access group is the active/active manner, each multi-homing access group has a globally unique link aggregation group (LAG) ID, and the LAG ID may be manually configured or automatically generated. When an access port of an edge RB is added to the active/active multi-homing access group, the edge RB announces the LAG ID using a TRILL protocol link-state packet (LSP). Edge RBs for which a same LAG ID is set in an entire network implement automatic discovery and discover that they all belong to a link aggregation group. A CE device considers an uplink connected to an edge RB as a LAG, that is, considers an access link of each edge RB in the multi-homing access group as a LAG (each multi-homing access group corresponds to a global LAG ID). An ES enables traffic to randomly reach an edge RB in the multi-homing access group. In this way, load balancing can be implemented among the edge RBs in the multi-homing access group based on traffic flow.

Figure 2:
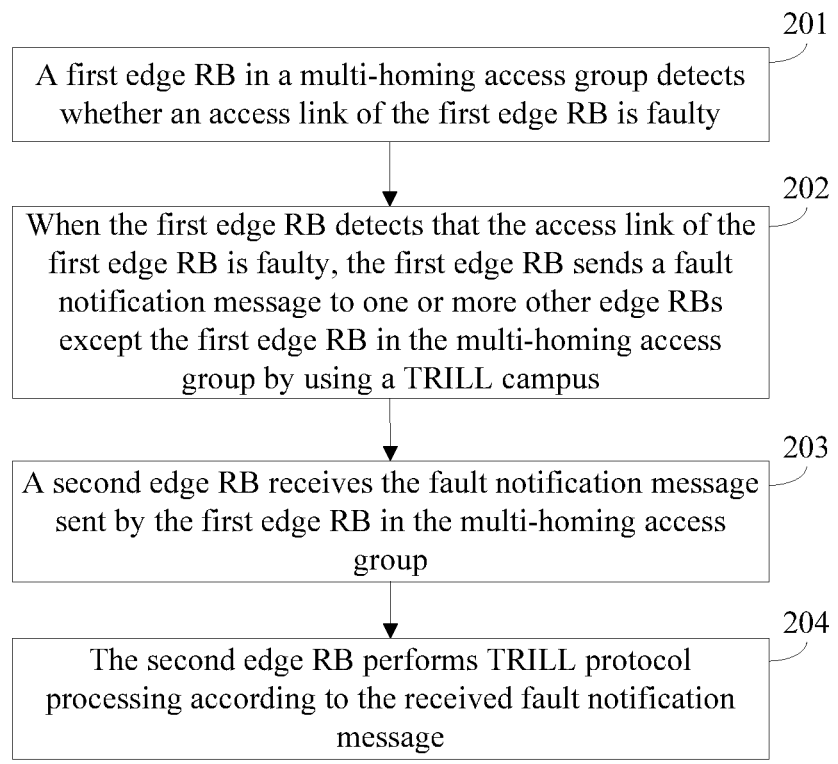
FIG. 2 is a schematic flowchart of a troubleshooting method for an edge RB in a TRILL campus according to an embodiment of the present disclosure.

FIG. 2 shows a troubleshooting method for an edge RB in a TRILL campus according to an embodiment of the present disclosure, and the method is applicable to the network architecture shown in FIG. 1. Referring to FIG. 2, the method includes the following steps.

Step 201: A first edge RB in a multi-homing access group detects whether an access link of the first edge RB is faulty.

The multi-homing access group is used to connect a CE device to the TRILL campus, the multi-homing access group includes at least two edge RBs, and each of the edge RBs is connected to the CE device using a respective access link.

It is easily known that step 201 is performed periodically.

Optionally, the multi-homing access group may work in an active/standby manner, or may work in an active/active manner.

Step 202: When the first edge RB detects that the access link of the first edge RB is faulty, the first edge RB sends a fault notification message to one or more other edge RBs except the first edge RB in the multi-homing access group using the TRILL campus.

The fault notification message is used to notify the one or more other edge RBs that the access link of the first edge RB is faulty.

When the multi-homing access group works in the active/standby manner, the fault notification message includes an ID of the first edge RB and an access port ID of the first edge RB. When the multi-homing access group works in the active/active manner, the fault notification message includes the ID of the first edge RB and an ID of a LAG to which the first edge RB belongs.

It is easily known that, when the first edge RB detects that the access link of the first edge RB is not faulty, step 201 is performed again after a predetermined interval.

Step 203: A second edge RB receives the fault notification message sent by the first edge RB in the multi-homing access group.

Step 204: The second edge RB performs TRILL protocol processing according to the received fault notification message.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

Figure 3A:
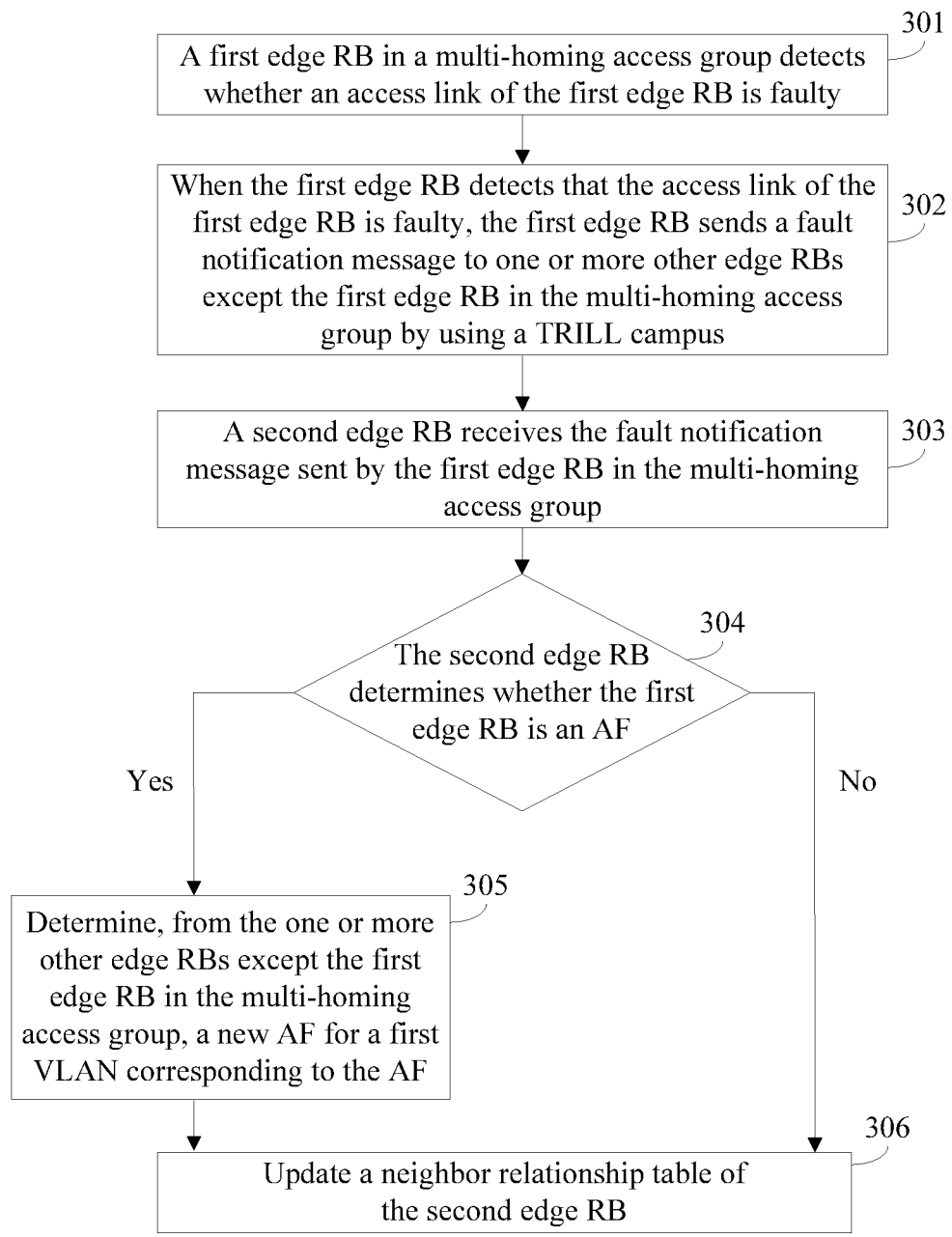
FIG. 3A is a schematic flowchart of another troubleshooting method for an edge RB in a TRILL campus according to an embodiment of the present disclosure.

FIG. 3A shows another troubleshooting method for an edge RB in a TRILL campus according to an embodiment of the present disclosure, and the method is applicable to the network architecture shown in FIG. 1. This embodiment is a further extension of the embodiment shown in FIG. 2. In this embodiment, a multi-homing access group works in an active/standby manner, an edge RB (that is, a first edge RB) whose access link is faulty is a current AF of a first VLAN, and a new AF of the first VLAN is specified by a DRB of the multi-homing access group. Referring to FIG. 3A, the method includes the following steps.

Step 301: The first edge RB in the multi-homing access group detects whether the access link of the first edge RB is faulty.

The multi-homing access group is used to connect a CE device to the TRILL campus, the multi-homing access group includes at least two edge RBs, and each of the edge RBs is connected to the CE device using a respective access link.

It is easily known that step 301 is performed periodically.

Step 302: When the first edge RB detects that the access link of the first edge RB is faulty, the first edge RB sends a fault notification message to one or more other edge RBs except the first edge RB in the multi-homing access group using the TRILL campus.

The fault notification message is used to notify the one or more other edge RBs that the access link of the first edge RB is faulty.

Further, the fault notification message includes an ID of the first edge RB and an access port ID of the first edge RB.

It is easily known that, when the first edge RB detects that the access link of the first edge RB is not faulty, step 301 is performed again after a predetermined interval.

In an exemplary implementation manner of this embodiment, the fault notification message is encapsulated using a TRILL data packet. Encapsulation using the TRILL data packet can reduce a calculation amount for an intermediate RB in the TRILL campus, and enable the fault notification message to reach the one or more other edge RBs except the first edge RB in the multi-homing access group more quickly. It is easily known that, in another implementation manner of this embodiment, the fault notification message may be encapsulated using a TRILL control packet.

During implementation, the fault notification message may be sent over a TRILL Rbridge channel. The TRILL Rbridge channel is a data channel that can bear the TRILL control packet. Therefore, whether the fault notification message is encapsulated using the TRILL data packet or is encapsulated using the TRILL control packet, the fault notification message can be sent over the TRILL Rbridge channel.

Further, the fault notification message may be encapsulated in a unicast or multicast manner.

Step 303: A second edge RB receives the fault notification message sent by the first edge RB in the multi-homing access group.

Step 304: The second edge RB determines whether the first edge RB is an AF. When the first edge RB is the AF, step 305 and step 306 are performed. When the first edge RB is not the AF, step 306 is performed.

As described above, when the multi-homing access group works in the active/standby manner, each edge RB may store a neighbor relationship table. The neighbor relationship table includes neighbor information of each neighbor, and the neighbor information includes at least an ID of a neighbor, an access port ID of the neighbor, a DRB priority of the neighbor, and VLAN IDs (indicating VLANs for which the neighbor serves as an AF) corresponding to the access port ID of the neighbor. Therefore, when receiving the fault notification message, the second edge RB may determine, according to the neighbor relationship table, whether the first edge RB is the AF.

It should be noted that, to balance network load, edge RBs in a multi-homing access group generally serve as AFs of different VLANs and are used to forward packets from the different VLANs. Therefore, during implementation, step 304 may be ignored, and step 305 and step 306 are directly performed.

Step 305: Determine, from the one or more other edge RBs except the first edge RB in the multi-homing access group, a new AF for the first VLAN corresponding to the AF.

Figure 3B:
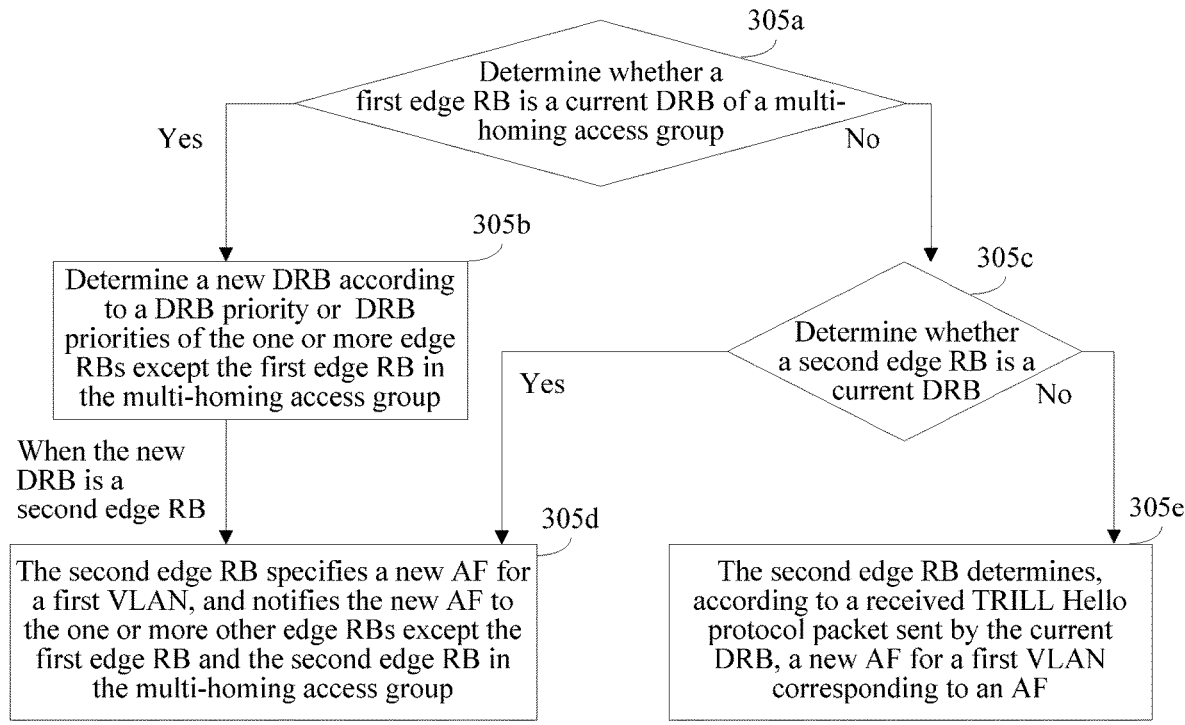
FIG. 3B is a schematic flowchart of an implementation method of step 305 in an embodiment illustrated in FIG. 3A.

Optionally, in an implementation manner of this embodiment, as shown in FIG. 3B, step 305 includes the following steps.

Step 305*a*: The second edge RB determines whether the first edge RB is a current DRB of the multi-homing access group. When the first edge RB is the current DRB, step 305*b* is performed, and when the first edge RB is not the current DRB, step 305*c* is performed.

Step 305*b*: Determine a new DRB according to a DRB priority or DRB priorities of the one or more other edge RBs except the first edge RB in the multi-homing access group. When the new DRB is the second edge RB, step 305*d* is performed.

Step 305*c*: Determine whether the second edge RB is the current DRB. When the second edge RB is the current DRB, step 305*d* is performed, and when the second edge RB is not the current DRB, step 305*e* is performed.

Step 305*d*: The second edge RB specifies a new AF for the first VLAN, and notifies the new AF to one or more other edge RBs except the first edge RB and the second edge RB in the multi-homing access group.

Step 305*e*: The second edge RB determines, according to a received TRILL Hello protocol packet sent by the current DRB, a new AF for the first VLAN corresponding to the AF.

An AF is specified by a DRB. Therefore, in step 305*e*, the second edge RB may determine the new AF for the first VLAN corresponding to the AF by directly acquiring AF information carried in the TRILL Hello protocol packet sent by the current DRB.

Figure 3C:
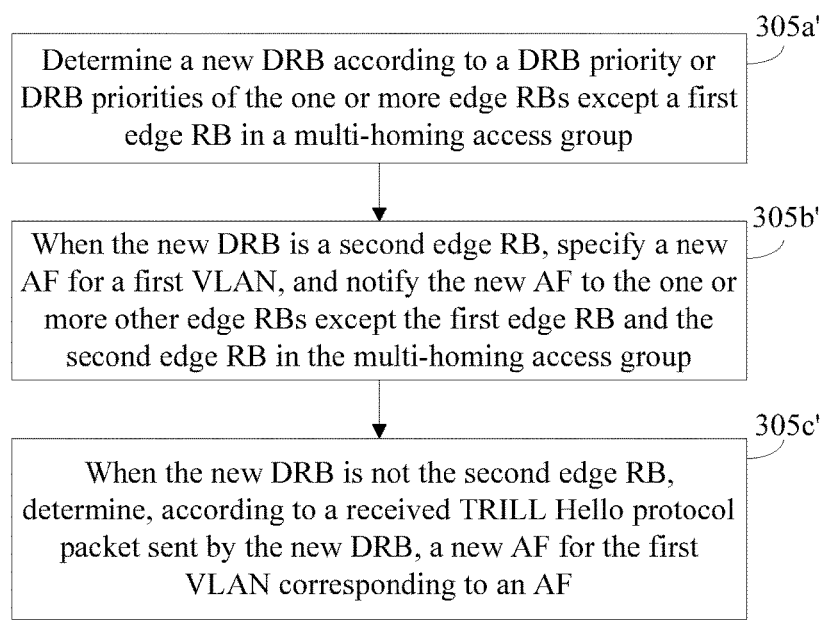
FIG. 3C is a schematic flowchart of another implementation method of step 305 in the embodiment illustrated in FIG. 3A.

Optionally, in an implementation manner of this embodiment, as shown in FIG. 3C, step 305 includes the following steps.

Step 305*a'*: Determine a new DRB according to a DRB priority or DRB priorities of the one or more other edge RBs except the first edge RB in the multi-homing access group.

It is easily known that the new DRB may be the same as a current DRB that exists when the fault notification message is received, or may be different from a current DRB that exists when the fault notification message is received.

Furthermore, step 305*a'* includes acquiring, from a neighbor relationship table stored by the second edge RB, the DRB priority or the DRB priorities of one or more other edge RBs except the first edge RB in multi-homing access group, and selecting an edge RB of a highest DRB priority as the new DRB of the multi-homing access group.

Step 305*b'*: When the new DRB is the second edge RB, specify a new AF for the first VLAN, and notify the new AF to one or more other edge RBs except the first edge RB and the second edge RB in the multi-homing access group.

Step 305*c'*: When the new DRB is not the second edge RB, determine, according to a received TRILL Hello protocol packet sent by the new DRB, a new AF for the first VLAN corresponding to the AF.

An AF is specified by a DRB. Therefore, in step 305*c'*, the second edge RB may determine the new AF for the first VLAN corresponding to the AF by directly acquiring AF information carried in the TRILL Hello protocol packet sent by the new DRB.

Each edge RB stores a DRB priority of each neighbor, and therefore, this implementation manner is simpler.

Step 306: Update a neighbor relationship table of the second edge RB.

Furthermore, updating a neighbor relationship table of the second edge RB includes deleting information about the first edge RB, and adding information about an edge RB that becomes the new AF (that is, performing an update by adding a VLAN ID corresponding to the edge RB that becomes the new AF).

It may be understood that step 305 and step 306 are not sequential and may be performed at the same time.

After the second edge RB is specified as the new AF of the first VLAN, a correspondence is established between the second edge RB and the first VLAN in order to forward, in the TRILL campus, a packet from the first VLAN subsequently.

TRILL protocol processing performed according to the fault notification message is implemented by means of step 304 to step 306.

It should be noted that the foregoing step 304, step 305, and step 306 are especially applicable to a scenario in which a multi-homing access group includes more than three edge RBs. When a multi-homing access group includes two edge RBs, and when a second edge RB receives a fault notification message sent by a first edge RB, the second edge RB only needs to delete a neighbor relationship of the first edge RB from a neighbor relationship table, and the second edge RB itself directly serves as a DRB to specify the second edge RB as an AF of all VLANs that access the TRILL campus using the second edge RB.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

Figure 4:
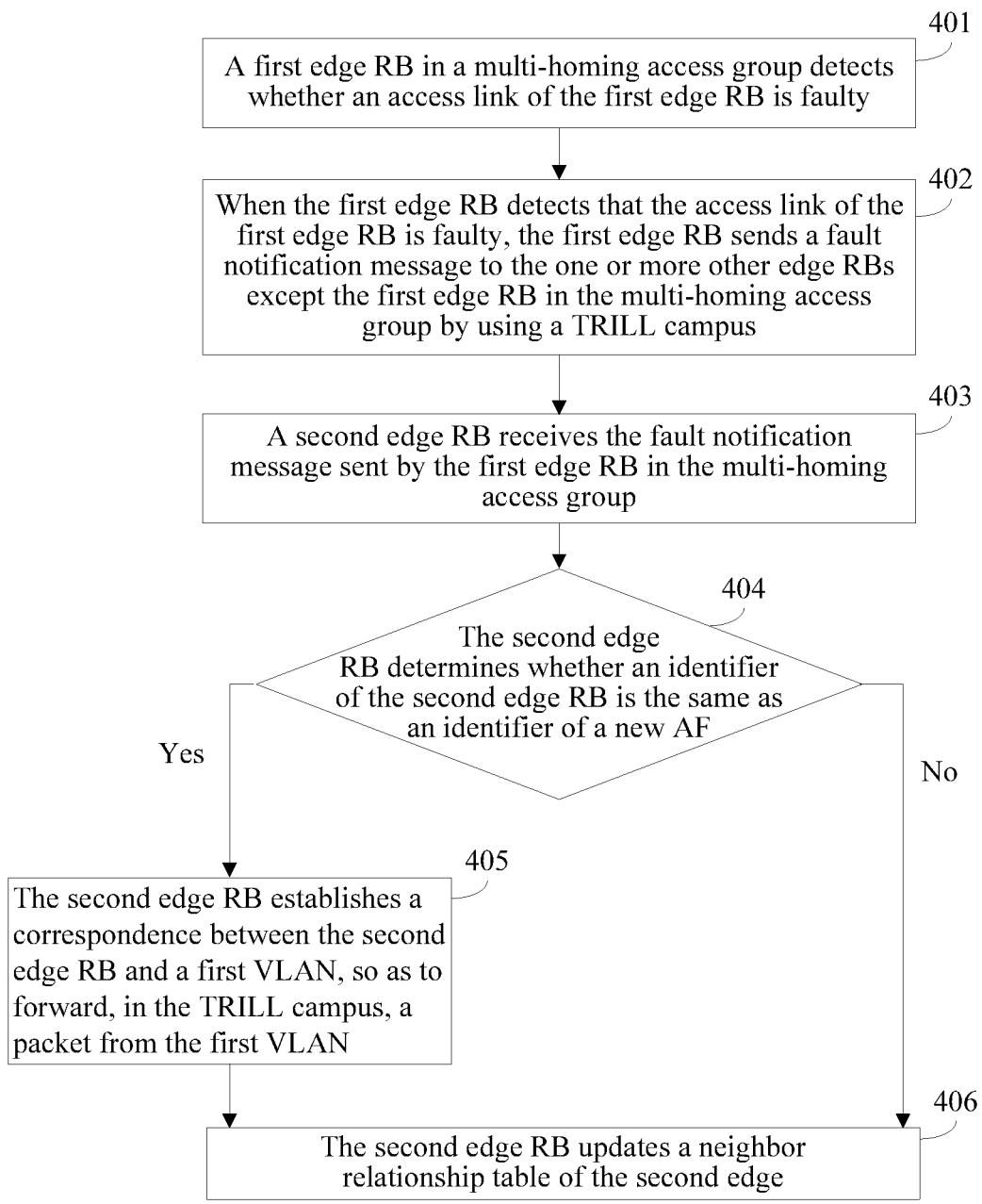
FIG. 4 is a schematic flowchart of still another troubleshooting method for an edge RB in a TRILL campus according to an embodiment of the present disclosure.

FIG. 4 shows still another troubleshooting method for an edge RB in a TRILL campus according to an embodiment of the present disclosure, and the method is applicable to the network architecture shown in FIG. 1. This embodiment is a further extension of the embodiment shown in FIG. 2. In this embodiment, a multi-homing access group still works in an active/standby manner, an edge RB (that is, a first edge RB) whose access link is faulty is a current AF of a first VLAN, and a new AF of the first VLAN is specified by the first edge RB. Referring to FIG. 4, the method includes the following steps.

Step 401: The first edge RB in the multi-homing access group detects whether the access link of the first edge RB is faulty.

The multi-homing access group is used to connect a CE device to the TRILL campus, the multi-homing access group includes at least two edge RBs, and each of the edge RBs is connected to the CE device using a respective access link.

It is easily known that step 401 is performed periodically.

Step 402: When the first edge RB detects that the access link of the first edge RB is faulty, the first edge RB sends a fault notification message to one or more other edge RBs except the first edge RB in the multi-homing access group using the TRILL campus.

The fault notification message is used to notify the one or more other edge RBs that the access link of the first edge RB is faulty.

Furthermore, the fault notification message includes an ID of the first edge RB, an access port ID of the first edge RB, an ID of the new AF of the first VLAN, and an access port ID of the new AF.

The new AF of the first VLAN is determined by the first edge RB according to neighbor information stored by the first edge RB and from the one or more other edge RBs except the first edge RB in the multi-homing access group. In this embodiment, it needs to be ensured that each edge RB in the multi-homing access group uses a same AF calculation method to calculate an AF.

Step 403: A second edge RB receives the fault notification message sent by the first edge RB in the multi-homing access group.

Step 404: The second edge RB determines whether an identifier of the second edge RB is the same as an identifier of the new AF. When the ID of the second edge RB is the same as the ID of the new AF, step 405 and step 406 are performed. When the identifier of the second edge RB is different from the identifier of the new AF, step 406 is performed.

Step 405: The second edge RB establishes a correspondence between the second edge RB and the first VLAN, so as to forward, in the TRILL campus, a packet from the first VLAN.

Step 406: The second edge RB updates a neighbor relationship table of the second edge RB.

TRILL protocol processing performed according to the fault notification message is implemented by means of step 404, step 405, and step 406.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability. In addition, in this embodiment of the present disclosure, the first edge RB whose access link is faulty directly calculates a new AF, and notifies the one or more other edge RBs of the new AF using the fault notification message, which may further shorten network convergence time.

Figure 5:
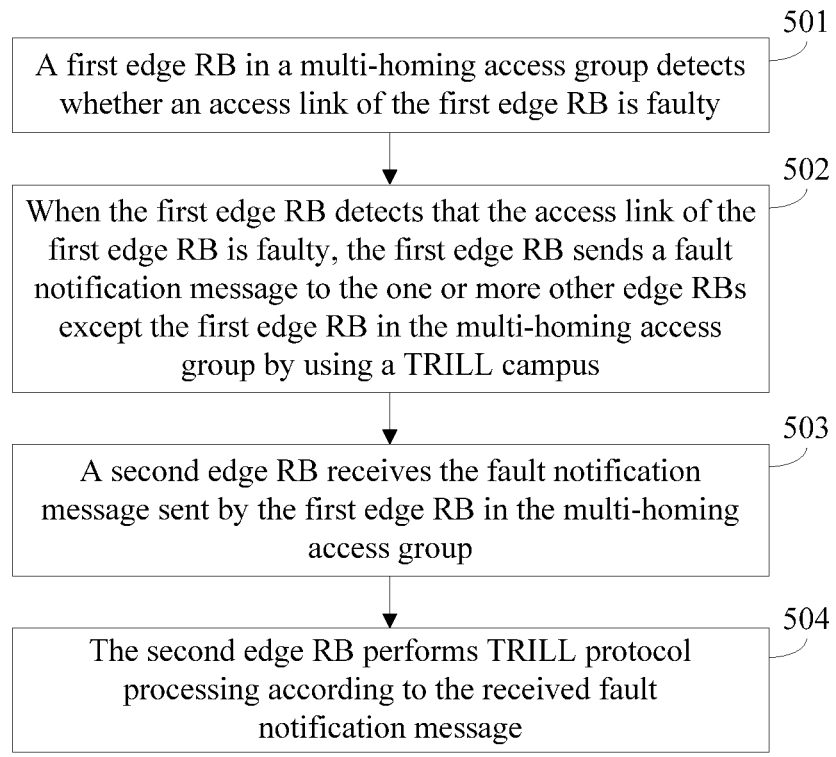
FIG. 5 is a schematic flowchart of still another troubleshooting method for an edge RB in a TRILL campus according to an embodiment of the present disclosure.

FIG. 5 shows yet another troubleshooting method for an edge RB in a TRILL campus according to an embodiment of the present disclosure, and the method is applicable to the network architecture shown in FIG. 1. This embodiment is a further extension of the embodiment shown in FIG. 2. In this embodiment, a multi-homing access group works in an active/active manner. Referring to FIG. 5, the method includes the following steps.

Step 501: A first edge RB in the multi-homing access group detects whether an access link of the first edge RB is faulty.

The multi-homing access group is used to connect a CE device to the TRILL campus, the multi-homing access group includes at least two edge RBs, and each of the edge RBs is connected to the CE device using a respective access link.

It is easily known that step 501 is performed periodically.

Step 502: When the first edge RB detects that the access link of the first edge RB is faulty, the first edge RB sends a fault notification message to one or more other edge RBs except the first edge RB in the multi-homing access group using the TRILL campus.

The fault notification message is used to notify the one or more other edge RBs that the access link of the first edge RB is faulty.

Furthermore, the fault notification message includes an ID of the first edge RB and an ID of a LAG to which the first edge RB belongs.

It is easily known that, when the first edge RB detects that the access link of the first edge RB is not faulty, step 501 is performed again after a predetermined interval.

Step 503: A second edge RB receives the fault notification message sent by the first edge RB in the multi-homing access group.

Step 504: The second edge RB performs TRILL protocol processing according to the received fault notification message.

It should be noted that the multi-homing access group in this embodiment works in the active/active manner. In this case, there are multiple manners in which an edge RB performs protocol calculation again and updates a forwarding rule, and this embodiment of the present disclosure is not limited thereto.

For example, when an edge RB implements active/active access according to a composite mobile telecommunications (CMT) solution, a process of re-assigning a distribution tree is triggered after the second edge RB receives a fault notification message.

For another example, when the link aggregation control protocol (LACP) is executed between an edge RB and a CE to implement active/active access, the second edge RB triggers a process of re-selecting an active port after the second edge RB receives a fault notification message.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

Figure 6:
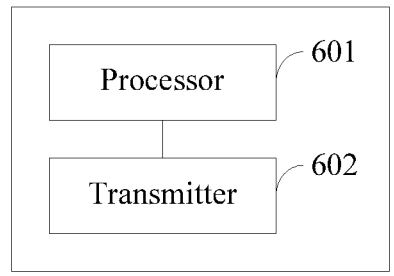
FIG. 6 is a schematic diagram of a structure of a troubleshooting apparatus for an edge RB in a TRILL campus according to an embodiment of the present disclosure.

FIG. 6 shows a troubleshooting apparatus for an edge RB in a TRILL campus according to an embodiment of the present disclosure. The apparatus may be the foregoing first edge RB and can implement a function of the first edge RB in the foregoing method embodiments. As shown in FIG. 6, the apparatus includes a processor 601 configured to detect whether an access link of a first edge RB in a multi-homing access group is faulty, where the multi-homing access group is used to connect a CE device to the TRILL campus, the multi-homing access group includes at least two edge RBs, and each of the edge RBs is connected to the CE device using a respective access link, and a transmitter 602 configured to send a fault notification message to one or more other edge RBs except the first edge RB in the multi-homing access group using the TRILL campus when the processor 601 detects that the access link of the first edge RB is faulty, where the fault notification message is used to notify the one or more other edge RBs that the access link of the first edge RB is faulty.

Optionally, the multi-homing access group may work in an active/standby manner, or may work in an active/active manner.

When the multi-homing access group works in the active/standby manner, this embodiment of the present disclosure includes the following two implementation manners.

First manner (referring to the embodiment shown in FIG. 3A): When the first edge RB is a current AF of a first VLAN, a new AF of the first VLAN is specified by a DRB. In this case, the fault notification message includes at least an identifier of the first edge RB and an access port ID of the first edge RB.

Second manner (referring to the embodiment shown in FIG. 4): When the first edge RB is a current AF of a first VLAN, a new AF of the first VLAN is specified by the first edge RB. In this case, in addition to an ID of the first edge RB and an access port ID of the first edge RB, the fault notification message further includes an ID of the new AF of the first VLAN and an access port ID of the new AF.

When the multi-homing access group works in the active/active manner, the fault notification message includes an ID of the first edge RB and an ID of a LAG to which the first edge RB belongs.

Preferably, the fault notification message is encapsulated using a TRILL data packet. Encapsulation using the TRILL data packet can reduce a calculation amount for an intermediate RB in the TRILL campus, and enable the fault notification message to reach the one or more other edge RBs except the first edge RB in the multi-homing access group more quickly. It is easily known that, in another implementation manner of this embodiment, the fault notification message may be encapsulated using a TRILL control packet.

During implementation, the fault notification message may be sent over a TRILL Rbridge channel. The TRILL Rbridge channel is a data channel that can bear the TRILL control packet. Therefore, whether the fault notification message is encapsulated using the TRILL data packet or is encapsulated using the TRILL control packet, the fault notification message can be sent over the TRILL Rbridge channel.

Further, the fault notification message may be encapsulated in a unicast or multicast manner.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

Figure 7:
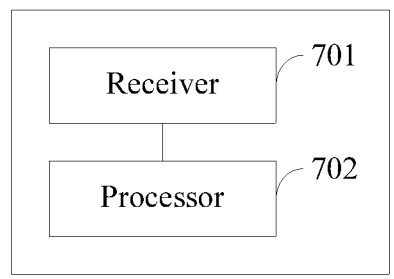
FIG. 7 is a schematic diagram of a structure of another troubleshooting apparatus for an edge RB in a TRILL campus according to an embodiment of the present disclosure.

FIG. 7 shows another troubleshooting apparatus for an edge RB in a TRILL campus according to an embodiment of the present disclosure. The apparatus may be the foregoing second edge RB and can implement a function of the second edge RB in the foregoing method embodiment. As shown in FIG. 7, the apparatus includes a receiver 701 configured to receive, using the TRILL campus, a fault notification message sent by a first edge RB in a multi-homing access group, where the multi-homing access group is used to connect a CE device to the TRILL campus, the multi-homing access group includes at least two edge RBs, and each of the edge RBs is connected to the CE device using a respective access link, and a processor 702 configured to perform TRILL protocol processing according to the fault notification message received by the receiver 701.

Preferably, the fault notification message is encapsulated using a TRILL data packet. Encapsulation using the TRILL data packet can reduce a calculation amount for an intermediate RB in the TRILL campus, and enable the fault notification message to reach one or more other edge RBs except the first edge RB in the multi-homing access group more quickly. It is easily known that, in another implementation manner of this embodiment, the fault notification message may be encapsulated using a TRILL control packet.

When the multi-homing access group works in an active/standby manner, this embodiment of the present disclosure includes the following two implementation manners.

First manner (referring to the embodiment shown in FIG. 3A): When the first edge RB is a current AF of a first VLAN, a new AF of the first VLAN is specified by a DRB. In this case, the fault notification message includes at least an identifier of the first edge RB and an access port identifier of the first edge RB.

Second manner (referring to the embodiment shown in FIG. 4): When the first edge RB is a current AF of a first VLAN, a new AF of the first VLAN is specified by the first edge RB. In this case, in addition to an identifier of the first edge RB and an access port identifier of the first edge RB, the fault notification message further includes an identifier of the new AF of the first VLAN and an access port identifier of the new AF.

Further, in the first implementation manner, the processor 702 is configured to when the first edge RB is the original appointed forwarder AF, determine, from one or more other edge RBs except the first edge RB in the multi-homing access group, the new AF for the first VLAN corresponding to the AF.

The processor 702 may specify the new AF for the first VLAN according to the process shown in FIG. 3C. Furthermore, the processor 702 is configured to determine a new designated routing bridge DRB according to a DRB priority or DRB priorities of the one or more other edge RBs except the first edge RB in the multi-homing access group, and specify the new AF for the first VLAN, and notify the new AF to one or more other edge RBs except the first edge RB and the second edge RB in the multi-homing access group when the new DRB is a second edge RB to which the processor 702 belongs, or determine, from the one or more other edge RBs except the first edge RB in the multi-homing access group, the new AF for the first VLAN according to a received TRILL Hello protocol packet sent by the new DRB when the new DRB is not a second edge RB to which the processor 702 belongs.

Optionally, in the first implementation manner, the processor may be further configured to specify the new AF for the first VLAN according to the process shown in FIG. 3B. For a specific process, refer to steps 305a to 305e, and details are not described herein again.

In the second implementation manner, the processor 702 is configured to determine whether an ID of the second edge RB to which the processor 702 belongs is the same as the ID of the new AF, and establish a correspondence between the second edge RB and the first VLAN in order to send a packet from the first VLAN to the TRILL campus when the identifier of the second edge RB is the same as the identifier of the new AF.

When the multi-homing access group works in the active/active manner, the fault notification message includes the ID of the first edge RB and an ID of a LAG to which the first edge RB belongs.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

Figure 8:
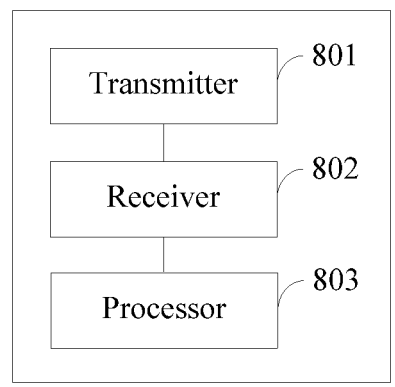
FIG. 8 is a schematic diagram of a structure of still another troubleshooting apparatus for an edge RB in a TRILL campus according to an embodiment of the present disclosure.

FIG. 8 shows still another troubleshooting apparatus for an edge RB in a TRILL campus according to an embodiment of the present disclosure. The apparatus may be the foregoing first edge RB or second edge RB. As shown in FIG. 8, the apparatus includes a transmitter 801, a receiver 802, and a processor 803. The transmitter 801 is configured to implement a function of the transmitter 602 shown in FIG. 6. The receiver 802 is configured to implement a function of the receiver 701 shown in FIG. 7. The processor 803 is configured to implement functions of the processor 601 in FIG. 6 and the processor 702 in FIG. 7.

In this embodiment of the present disclosure, when an access link of a first edge RB is faulty, the first edge RB sends a fault notification message to one or more other edge RBs in a multi-homing access group using a TRILL campus such that the one or more other edge RBs may perceive the faulty access link of the first edge RB in a timely manner and then perform TRILL protocol processing as soon as possible, thereby increasing a network convergence speed and network reliability.

It should be noted that the foregoing functional module division is used only as an example for describing troubleshooting performed by the troubleshooting apparatus for an edge RB in a TRILL campus according to the foregoing embodiment. In actual application, the foregoing functions can be allocated to different modules and implemented according to a requirement, that is, an inner structure of a device is divided into different functional modules to implement all or some of the functions described above. In addition, the foregoing embodiment of the troubleshooting apparatus for an edge RB in a TRILL campus and the embodiment of the troubleshooting method for an edge RB in a TRILL campus are based on a general concept. For a specific implementation process, refer to the method embodiment, and details are not described herein again.

The sequence numbers of the foregoing embodiments of the present disclosure are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, an optical disc, or the like.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for fault notification in a Transparent Interconnection of Lots of Links (TRILL) campus, comprising:
   receiving a fault notification message by a second edge routing bridge (RB) in a multi-homing access group, from a first edge RB in the multi-homing access group, through the TRILL campus, before a predetermined time, and when a first access link of the first edge RB is faulty, wherein the fault notification message comprises an identifier of the first edge RB and an access port identifier of the first edge RB when the multi-homing access group works in an active/standby manner, wherein the multi-homing access group comprises multiple edge RBs including the first edge RB and the second edge RB, and wherein the multi-homing access group couples a customer edge device to the TRILL campus using the first access link for the first edge RB and a second access link for the second RB; and
   determining, by the second edge RB in response to receiving the fault notification message, a new appointed forwarder (AF) from the multiple RBs except the first edge RB, wherein the new AF is for a virtual local area network (VLAN) when the first edge RB is a current AF for the VLAN.

2. The method of claim 1, wherein determining the new AF comprises:
   determining, by the second edge RB, a new designated routing bridge (DRB) according to a DRB priority or DRB priorities of the edge RBs except the first edge RB in the multi-homing access group, wherein the new DRB is the second edge RB;
   determining, by the second edge RB, the new AF for the VLAN; and
   notifying an edge RB in the multi-homing access group of the new AF, wherein the edge RB is not the first edge RB and is not the second edge RB.

3. An apparatus in a Transparent Interconnection of Lots of Links (TRILL) campus, the apparatus comprising:
  a memory configured to store program instructions;
  a processor coupled to the memory and configured to execute the program instructions to:
    receive a fault notification message through the TRILL campus, from a first edge routing bridge (RB) in a multi-homing access group, before a predetermined time, and when a first access link of the first edge RB is faulty, wherein the multi-homing access group comprises multiple edge RBs including the first edge RB and the apparatus, wherein the multi-homing access group couples a customer edge device to the TRILL campus using the first access link for the first edge RB and a second access link for the apparatus, and wherein the fault notification message comprises an identifier of the first edge RB and an access port identifier of the first edge RB when the multi-homing access group works in an active/standby manner; and
    determine, from the edge RBs except the first edge RB in response to receiving the fault notification message, a new appointed forwarder (AF) for a virtual local area network (VLAN) when the first edge RB is a current AF for the VLAN.

4. The apparatus of claim 3, wherein the processor is further configured to execute the program instructions to:
  determine a new designated routing bridge (DRB) according to a DRB priority or DRB priorities of the multiple edge RBs except the first edge RB in the multi-homing access group, wherein the new DRB is the apparatus;
  determine a new AF for the VLAN; and
  notify a third edge RB of the new AF, wherein the third edge RB is different from the first edge RB and the apparatus in the multi-homing access group.

5. The method of claim 1, wherein determining the new AF comprises:
  determining, by the second edge RB, a new designated routing bridge (DRB) according to a DRB priority or DRB priorities of the edge RBs except the first edge RB in the multi-homing access group, wherein the new DRB is not the second edge RB; and
  identifying a new AF for the VLAN according to a received TRILL Hello protocol packet from the new DRB.

6. The apparatus of claim 3, wherein the processor is further configured to execute the program instructions to:
  determine a new designated routing bridge (DRB) according to a DRB priority or DRB priorities of the multiple edge RBs except the first edge RB in the multi-homing access group, wherein the new DRB is not the apparatus; and
  identify a new AF for the VLAN according to a received TRILL Hello protocol packet from the new DRB.

7. A Transparent Interconnection of Lots of Links (TRILL) campus comprising:
  a multi-homing access group, wherein the multi-homing access group comprises multiple edge routing bridges (RBs) including a first edge RB and a second edge RB, wherein the multi-homing access group couples a customer edge device to the TRILL campus using a first access link for the first edge RB and a second access link for the second edge RB, wherein the multi-homing access group works in an active/standby manner, wherein the first edge RB is configured to:
    detect a fault of the first access link; and
    send a fault notification message through the TRILL campus to the second edge RB, and
  wherein the second edge RB is configured to:
    receive the fault notification message through the TRILL campus and before a predetermined time; and
    determine a new appointed forwarder (AF) from the multiple RBs except the first edge RB in response to receiving the fault notification message, wherein the new AF is for a virtual local area network (VLAN) when the first edge RB is a current AF for the VLAN.

8. The TRILL campus according to claim 7, wherein the second edge RB is configured to:
  determine a new designated routing bridge (DRB) according to a DRB priority or DRB priorities of the edge RBs except the first edge RB in the multi-homing access group, wherein the new DRB is the second edge RB;
  determine the new AF for the VLAN; and
  notify an edge RB in the multi-homing access group of the new AF, wherein the edge RB is not the first edge RB and is not the second edge RB.

9. The TRILL campus according to claim 7, wherein the second edge RB is configured to:
  determine a new designated routing bridge (DRB) according to a DRB priority or DRB priorities of the edge RBs except the first edge RB in the multi-homing access group, wherein the new DRB is not the second edge RB; and
  identify a new AF for the VLAN according to a received TRILL Hello protocol packet from the new DRB.

10. The TRILL campus according to claim 7, wherein the predetermined time is N TRILL Hello packet sending periods.

11. The TRILL campus according to claim 7, wherein the fault notification message is not a TRILL Hello packet.

12. The method of claim 1, wherein the predetermined time is N TRILL Hello packet sending periods.

13. The method of claim 1, wherein the fault notification message is not a TRILL Hello packet.

14. The apparatus of claim 3, wherein the predetermined time is N TRILL Hello packet sending periods.

15. The apparatus of claim 3, wherein the fault notification message is not a TRILL Hello packet.

* * * * *